Sept. 7, 1965   C. L. WHITEFORD   3,204,760
PACKAGES
Filed Oct. 10, 1962

INVENTOR.
CARLTON L. WHITEFORD
BY
Harold R. Kauffman
ATTORNEY

United States Patent Office 3,204,760
Patented Sept. 7, 1965

3,204,760
PACKAGES
Carlton L. Whiteford, New Canaan, Conn., assignor to Poly-Pak Corporation of America, Springdale, Conn., a corporation of Delaware
Filed Oct. 10, 1962, Ser. No. 229,659
4 Claims. (Cl. 206—46)

This invention relates broadly to packages. More particularly the invention is concerned with packages of the type wherein the material or substance to be packaged is surrounded by at least one envelope comprised of a thermoplastic film. Examples of materials which are thus packaged are edible materials such as candy, nuts, pre-cooked or partially cooked or baked foods of all kinds, the different kinds and varieties of frozen foods, etc.; surgical sutures and other items for hospital, home, laboratory and industrial uses, and for use by the military forces; as well as almost any other merchandise that, in general, is not too heavy or too sharp-pointed or -edged.

Taking frozen foods as illustrative of the merchandise to be packaged and, more specifically, such foods which are prepared for eating by immersing an envelope or pouch containing the frozen food in boiling water, the envelopes therefore used for this purpose have not been entirely satisfactory. The prior, commercially-used envelopes were generally formed of a laminated film, for instance a laminate of a polyester film and a polyethylene film or coating. A single seal was made at the outer edges of the envelope by heat-sealing together an overlaying portion of the laminated film adjacent the outer edges. The resulting fusion seal or weld constituted the seal for the envelope. This seal often broke under the stress resulting, for example, when the package (or cardboard carton containing the same) was inadvertently dropped, or was otherwise subjected to high-impact forces during shipping and handling prior to use by the ulimate consumer. This breakage of the seal permitted the entrance of air and, in many cases, discoloration or even spoilage of the food in the package. Often, too, the rupture of the seal and/or delamination of the film allowed exudation of food, especially when the package was immersed in boiling water as required in preparing the food for eating.

It is a primary object of the present invention to provide an improved package of the class broadly described in the first paragraph of this specification, and which minimizes or completely obviates the disadvantages of the previously-used packages of this class, some of which disadvantages have been mentioned in the preceding paragraph.

Another object of the invention is to provide a hermetically-sealed package which has, in effect, a "built-in" shock absorber.

Still another object of the invention is to provide an improved envelope for packages of the kind with which this invention is concerned, which envelope can be made at a relatively low cost from presently available or easily prepared unlaminated thermoplastic films using available equipment.

Other objects of the invention will be apparent to those skilled in the art from the following more detailed description when considered in connection with the accompanying drawing.

The novel features of the invention are set forth in the appended claims. The invention itself, however, will best be understood by reference to the following description taken with the accompanying drawing, which illustrates a preferred embodiment of the invention, and in which FIGURE 1 is an elevational view of an open-ended envelope of the invention, the top being open for filling with merchandise by the merchandiser or packager;

The present invention is based on my discovery that an improved package of the class with which this invention is concerned can be produced by surrounding the material to be packaged with at least one envelope comprised of a thermoplastic film which is overlayingly heat-sealable together at least in the area adjacent its outer edges to varying degrees of seal or sealment. The package itself has at least one outer edge which is heat-sealed in the area adjacent said edge in accordance with the present invention, but may have a plurality (two, three, four, five, six or any higher number) of outer edges, the adjacent areas of which are to be sealed. The envelope (and, hence, the package also) is provided with a multi-seal adjacent at least one (i.e., one or a plurality) of its outer edge or edges. This multi-seal includes or comprises an inner semi-seal or peelable seal that is capable of rupturing under stress and, spaced, from the said inner seal, an outer full or welded seal.

By using the above-described multi-seal of this invention in packaging merchandise, the surprising and unobvious discovery was made that the inner semi-seal opens up, parts or separates (or tends to open up, part or separate) under the stress of high-impact forces or excessive pressures. Hence the semi-seal functions as a shock-absorber or cushion so that the effect of such forces is not directly impinged upon the outer welded seal, which latter also may be described as being a fused or permanently heat-sealed outer seal. Certain crystalline materials tend to become somewhat embrittled at the temperature of fusion, with the result that cracking often takes place at the weld.

The foregoing discovery is a matter of considerable practical significance and value as will be immediately apparent to those skilled in the art. It provides a degree of protection against package damage (and, therefore, also to the contents) that heretofore has not been attainable. It makes possible a substantial decrease in marketing costs, since fewer packages are damaged and there is a material reduction in the number of "returns" or complaints by the purchaser. Of perhaps even greater importance and benefit, but one which is more difficult to measure in tangible value, is the fact that annoyance of regular customers is minimized or obviated. Consequently there is the greater likelihood that they will continue to remain as regular customers and will not change their buying habits.

Figure 1:
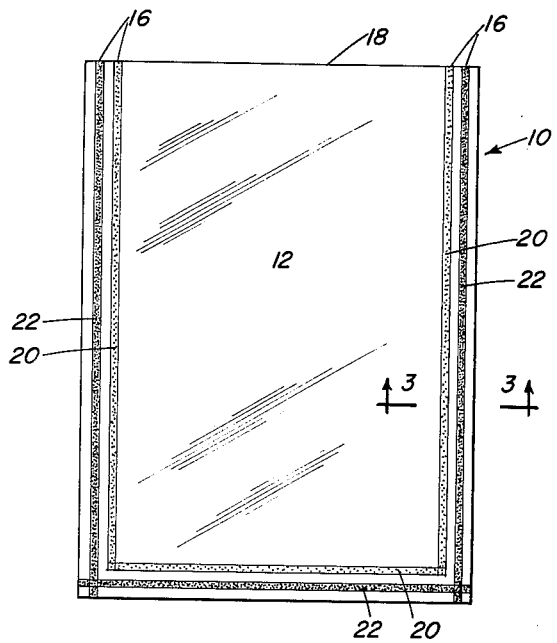
Figure 2:
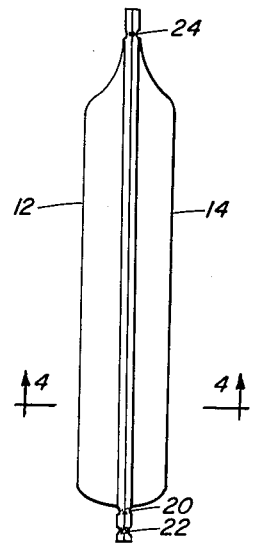
FIGURE 2 is a side elevational view of a filled envelope or package of the invention, showing the merchandiser's or packager's seal at the top, and a double seal in accordance with the present invention at the bottom.

Referring now to the drawing and more particularly to FIGURES 1 and 2, there is shown an envelope or pouch 10 having a front wall 12 and a rear wall 14. These walls are overlayingly heat-sealed together by the multi-seal 16 in the areas adjacent their front, rear and bottom outer edges to form the envelope 10 having an upper opening 18.

The envelope 10 is comprised of an unlaminated thermoplastic film which, as has been indicated hereinbefore, is overlayingly heat-sealable together at least in the areas adjacent its outer edges to varying degrees of heat-sealability. Examples of such films are copolymers of copolymerizable ingredients including ethylene and propylene and which contain combined in the copolymer molecule from, for instance, about 10 to about 50 molar percent of ethylene and from about 90 to about 50 molar percent of propylene; homogeneous blends of homopolymeric propylene in weight percentages approximating the molar percentages just mentioned with reference to copolymers of ethylene and propylene; homogeneous blends of other water-insoluble, thermoplastic homopolymers, e.g., homopolymeric vinyl and vinylidene halides such as the chlorides, bromides and fluorides, acrylonitrile, the various substituted and unsubstituteed styrenes, including the various chlorinated and other halogenated styrenes, methylstyrenes, etc.; thermoplastic copolymers of the monomers used in making the aforementioned homopolymers with each other and/or with other copolymerizable monomers; homogeneous blends of the aforementioned homopolymers with each other, of the aforementioned copolymers with each other, and blends of the aforesaid homopolymers and copolymers with each other.

The heat-sealable thermoplastic film of which the envelope 10 is comprised also may be formed of a thermoplastic homopolymer or copolymer, examples of which have been given before, that have substantially the same elementary chemical constitution but wherein the molecular-weight distribution is so widely distributed between relatively low-molecular-weight material and relatively high-molecular-weight material that the film will be heat-sealable together to varying degrees of heat-sealability.

Thermoplastic films can be made from the above described polymeric materials, by appropriate selection of the chosen materials and/or proportions employed in the case of blends and/or copolymers, that vary in their degree or extent of heat-sealability when subjected to sealing temperatures ranging from, for example, about 260° F. to about 450° F. (depending upon the time and pressure employed) in making a hermetic or fusion seal or weld; and, with the same composition of film, from, for instance, about 250° F. to about 375° F. in making a semi-seal or peelable seal that is capable of parting without rupturing under stress.

The thermoplastic film may be suitably treated to render it printable, dyeable, static-resistant, etc. It may contain any of the conventional effect agents commonly employed in film-forming compositions including, for example, a dye, pigment, plasticizer, lubricant, antistatic agent, antioxidant, ultraviolet absorber, filler, etc. The film may be clear and transparent, or it may be translucent or opaque. Preferably, the film employed is one which is clear and transparent. Preferably, also, the film is single-layered although the use of multi-layered (i.e., laminated) films is not precluded. The film usually has a thickness of between about 2 mils and about 10 mils but may range down to 1 mil or as high as 20 mils. Good results have been obtained with films from 2 to 6 mils thick.

Referring now again to the drawing, the multi-seal 16 is comprised of the inner semi-seal 20, which is rupturable under stress, and the outer hermetic seal or weld 22. The functions of these seals have been described hereinbefore.

Instead of a single semi-seal and a single outer seal as shown by way of illustration in the drawing one can use, if desired, two, three or more spaced-apart inner seals, the outer one of which is spaced apart from a single outer welded seal or a plurality of such welded seals suitably spaced from each other. Obviously, the number of seals employed should be kept to the minimum required to produce the desired results.

The opening 18 (FIGURE 1) for filling the envelope 10 is closed by the packager by means of the seal 24 after the envelope has been filled. Seal 24 is a welded seal. It may be supplemented, if desired, by one or more inner semi-seals of the same kind as semi-seal 20.

Figure 3:
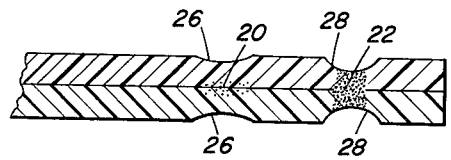
FIGURE 3 is a greatly enlarged cross-sectional view taken along the line 3—3 of FIGURE 1.

FIGURE 3, which is a greatly enlarged cross-sectional view taken along the line 3—3 of FIGURE 1, illustrates more clearly the relative thickness and spacing of seals 20 and 22. It also illustrates at 26 the depression or indentation in the film that is made by a heater bar or electrode in making the semi-seal 20; and at 28 the depression or indentation that is similarly made in the film when making the welded seal 22. In making these seals with a heater bar or electrode, the time and pressure employed are correlated with the temperature so as to produce the desired results. Reference has previously been made to the ranges of temperatures used and which vary depending, for example, upon the composition of the film, the thickness of the film alone and when overlaid, and other influencing variables. The time of heating is usually within the range of from about 0.1 second to about 1 second while the pressure is generally within the range of from about 2 p.s.i. to about 30 p.s.i.

Figure 4:
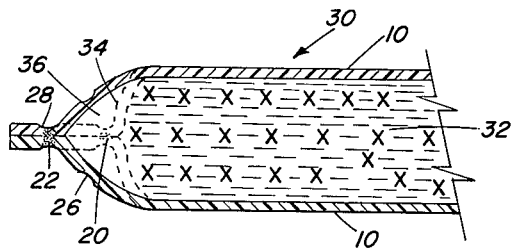
FIGURE 4 is an enlarged cross-sectional view taken along the line 4—4 of FIGURE 2.

FIGURE 4, which is an enlarged cross-sectional view taken along the line 4—4 of FIGURE 2, shows a portion of a package 30 which is comprised of an envelope 10 and merchandise, specifically edible material 32, contained within the envelope. The limit to which the envelope 10 can be filled with edible material is indicated by the dotted lines 34. If the package is dropped or otherwise subjected to sufficient shock to separate the semi-seal 20, then the void 36 is created. The edible material in the envelope can then pass into this void but cannot exude from the envelope since it is retained therein by the hermetic or fusion seal or weld 22.

Taking a thermoplastic film, 3 mils thick, formed of a copolymer of about 25 mole percent of ethylene and about 75 mole percent of propylene as illustrative of the thermoplastic film employed, a pouch or envelope is made therefrom and provided with a multiseal as hereinbefore described. The envelope is about 7 inches long and about 5 inches wide. The inner semi-seal and the outer welded seal are each about ⅛ inch wide, and are spaced from each other by an intermediate area which also is about ⅛ inch wide and wherein there is no seal or weld; hence an air space is formed in this intermediate area. The semi-seal is made by subjecting an overlying or superimposed (e.g., folded) portion of the film to a temperature of about 310° F. for about ¼ second under a pressure of about 7 p.s.i. The hermetic or welded seal is made by subjecting an overlying portion of the film that is outwardly spaced ⅛ inch from the semi-seal to a temperature of about 360° F. for about ¼ second under a pressure of about 7 p.s.i. This envelope us used in packaging food and other merchandise as hereinbefore described. The package resists breakage from shock without rupture of the outer welded seal and in all respects fulfills the objects of the invention.

Instead of using a copolymer of ethylene and propylene as above described, one can use a mixture of 25% by weight of homopolymeric ethylene and 75% by weight of homopolymeric propylene in making the thermoplastic film.

I claim:
1. An article of manufacture comprising a pair of overlying sheets of fusible resin material having corresponding dimensions, a fusion seal adjacent a major portion of the marginal edge of said overlying sheets defining an envelope having an open central chamber and a filler opening thereto, and a semi-seal joining said sheets for defiing a void closed chamber within said envelope, said semi-seal separating said open chamber and said void chamber.

2. An article of manufacture comprising a pair of overlying sheets of fusible resin material having corresponding dimensions, said sheets being joined by a fusion seal adjacent a major portion of the marginal edges of said overlying sheets defining an envelope having a filler opening, a semi-seal spaced inwardly from and coextensive with said fusion seal for joining said sheets defining a first chamber centrally of said envelope and a second chamber concentrically surrounding said first chamber, said semi-seal being relatively easily opened for communicating said central chamber and said surrounding chamber.

3. An article of manufacture according to claim 2, wherein each of said overlying sheets of fusible resin material comprises an integral film of thermoplastic material having a thickness between about 2 mils and about 10 mils.

4. A package comprising a pair of overlying sheets of fusible resin material having corresponding dimensions, said sheets being joined by a fusion seal adjacent a major portion of the marginal edges of said overlying sheets defining an envelope having a filler opening, a semi-seal spaced inwardly from and coextensive with said fusion seal for joining said sheets defining a first chamber centrally of said envelope and a second chamber concentrically surrounding said first chamber, said semi-seal being relatively easily opened for communicating said central chamber and said surrounding chamber, a packaged material within said first chamber, and a fusion seal closing said filler opening for confining said material within said package.

References Cited by the Examiner

UNITED STATES PATENTS

| 2,422,725 | 6/47 | Gilfillan. | |
| 2,633,284 | 3/53 | Moffett et al. | 206—46 |
| 2,788,821 | 4/57 | Marelle | 150—1 |
| 2,954,116 | 9/60 | Maso et al. | 206—56 |
| 3,012,894 | 12/61 | Nagel | 206—46 |

FOREIGN PATENTS 697,723    9/53    Great Britain.

THERON E. CONDON, *Primary Examiner.*

EARLE J. DRUMMOND, *Examiner.*